(12) United States Patent
Lontz et al.

(10) Patent No.: US 12,214,711 B2
(45) Date of Patent: Feb. 4, 2025

(54) EXPANDABLE WALL SHELTER

(71) Applicant: HDT EXPEDITIONARY SYSTEMS, INC., Solon, OH (US)

(72) Inventors: Travis Lontz, Fredericksburg, VA (US); Charles Deighton, Milford, OH (US); Wade Milek, Mason, OH (US)

(73) Assignee: HDT Expeditionary Systems, Inc., Solon, OH (US)

( * ) Notice: Subject to any disclaimer, the term of this patent is extended or adjusted under 35 U.S.C. 154(b) by 159 days.

(21) Appl. No.: 17/864,602

(22) Filed: Jul. 14, 2022

(65) Prior Publication Data

US 2023/0054064 A1 Feb. 23, 2023

Related U.S. Application Data

(60) Provisional application No. 63/222,255, filed on Jul. 15, 2021.

(51) Int. Cl.
*E04B 1/343* (2006.01)
*B60P 3/34* (2006.01)
(Continued)

(52) U.S. Cl.
CPC ................... *B60P 3/34* (2013.01); *B60P 3/36* (2013.01); *E04B 1/343* (2013.01); *E04B 1/344* (2013.01)

(58) Field of Classification Search
CPC .. E04B 1/343; E04B 1/344; B60P 3/36; B60P 3/34
(Continued)

(56) References Cited

U.S. PATENT DOCUMENTS

| | | | | |
|---|---|---|---|---|
| 963,769 A | * | 7/1910 | Johnson et al. | B65D 7/26 220/817 |
| 4,425,741 A | * | 1/1984 | Ronai | E04B 1/3445 217/14 |

(Continued)

FOREIGN PATENT DOCUMENTS

EP 1340862 A1 9/2003

OTHER PUBLICATIONS

Wenzlau Engineering / Expandable Shelters, Copyright 2016, Printed Jan. 26, 2023, 3 pages.
(Continued)

*Primary Examiner* — Paola Agudelo
(74) *Attorney, Agent, or Firm* — Lippes Mathias LLP

(57) ABSTRACT

An expandable wall shelter includes a body and a movable wall section connected to the body and movable between a retracted position and an extended position along a linear path. At least one linkage assembly is operably connected between the body and the movable wall section for operably and movably supporting the movable wall section relative to the body for movement of the movable wall section to and between its retracted and extended positions. The at least one linkage assembly includes: (i) an inner link including opposite inner and outer ends; and (ii) an outer link including opposite inner and outer ends, wherein: the inner end of the inner link is pivotally connected to the body; the said outer end of the outer link is pivotally connected to the movable wall section; and, the outer end of the inner link is pivotally connected to the inner end of the outer link. A linkage assembly for such a movable wall section is also provided.

17 Claims, 16 Drawing Sheets

(51) Int. Cl.
*B60P 3/36* (2006.01)
*E04B 1/344* (2006.01)

(58) Field of Classification Search
USPC ............................................................ 52/79.5
See application file for complete search history.

(56) References Cited

U.S. PATENT DOCUMENTS

| | | | |
|---|---|---|---|
| 5,237,784 A | 8/1993 | Ros | |
| 6,345,471 B1* | 2/2002 | Gyllenhammar | E04B 1/3444 296/26.02 |
| 7,175,219 B1* | 2/2007 | Blodgett, Jr. | B60P 3/34 296/26.14 |
| 7,828,367 B2 | 11/2010 | Hickam et al. | |
| 8,166,715 B2 | 5/2012 | De Azambuja | |
| 8,622,066 B2* | 1/2014 | Dolsby | E04H 15/008 52/64 |
| 8,943,759 B2 | 2/2015 | Warner et al. | |
| 2003/0080576 A1* | 5/2003 | Buls | B60P 3/34 296/26.12 |
| 2009/0044460 A1 | 2/2009 | Medley | |
| 2009/0217600 A1* | 9/2009 | De Azambuja | E04B 1/3444 52/79.5 |
| 2010/0269419 A1* | 10/2010 | Gyory | E04B 1/3483 52/79.5 |
| 2011/0132421 A1 | 6/2011 | Dolsby et al. | |
| 2014/0202089 A1* | 7/2014 | Nakajima | E04B 1/3442 52/79.5 |
| 2014/0259976 A1* | 9/2014 | Bowers | E04B 1/3445 52/79.5 |
| 2014/0311051 A1* | 10/2014 | Fagan | E04B 1/343 52/79.5 |
| 2015/0218794 A1* | 8/2015 | Martyn | E04B 1/343 52/79.5 |
| 2015/0267396 A1 | 9/2015 | Cantin et al. | |
| 2016/0102740 A1* | 4/2016 | Martyn | F16H 21/04 74/96 |
| 2017/0030071 A1* | 2/2017 | Sorensen | E04B 1/348 |
| 2017/0314255 A1* | 11/2017 | Klein | E04H 9/10 |
| 2017/0350114 A1* | 12/2017 | Crozier | E04B 1/3483 |
| 2021/0323465 A1* | 10/2021 | König | B60P 3/34 |

OTHER PUBLICATIONS

AAR 2:1 20-Foot ISO Shelter, Copyright 2020, 2 pages.
AAR 3:1 Expandable 20-Foot ISO Shelter, Copyright 2020, 2 pages.
AAR MECC—Mobile Expandable Container Configuration, Copyright 2020, 6 pages.
Kentucky Trailer, Mobile Marketing / Specialty Trailers, Printed Jan. 26, 2023, 4 pages.
Kentucky Trailer, Mobile Command Center / Military / Government / Specialty Trailers / Kentucky Trailer, Printed Jan. 26, 2023, 5 pages.
Craftsmen Industries, Inc., Enclosed Trailers, Copyright 2021, Printed Jan. 26, 2023, 6 pages.
BERG—An HDT Global Company, E2S2 Bicon, 10 Ft., Copyright 2020, 1 page.
BERG E2S2 Expandable Efficient Shelter System—The latest innovation in energy efficient expandable shelters, Copyright 2020, 2 pages.
BERG 3-in-1 TriCon Expandable Shelter System, Copyright 2020, 2 pages.
Sarrus Linkage Wikipedia page dated Oct. 28, 2019, Printed Jan. 26, 2023, 3 pages.
Conco Articulating Jib Arm, Up to 310lb. Capacity & 15' Reach, Copyright 2020, Printed Jan. 26, 2023, 5 pages.
BlogMech Jib Crane Tutorial, Printed Jan. 26, 2023, 10 pages.

* cited by examiner

EXPANDABLE WALL SHELTER

CROSS-REFERENCE TO RELATED APPLICATION

This application claims priority from and benefit of the filing date of U.S. provisional application Ser. No. 63/222,255 filed Jul. 15, 2021, and the entire disclosure of said provisional application is hereby expressly incorporated by reference into the present specification.

GOVERNMENT SUPPORT/GOVERNMENT LICENSE RIGHTS

This invention was made with government support under Contract No. W56HZV-19-C-0174 awarded by the Department of Defense U.S. Army Contracting Command. The government has certain rights in the invention.

ACKNOWLEDGMENT OF SUPPORT AND DISCLAIMER

This material is based upon work supported by the Army Contracting Command Warren under Contract No W56HZV19C0174. Any opinions, findings and conclusions or recommendations expressed in this material are those of the author(s) and do not necessarily reflect the views of the Government.

BACKGROUND INFORMATION

Portable shelters for transportation to and deployment at a remote site are widely known. These shelters are used by the military and others for establishing field offices, field hospitals, barracks, combat shelters, kitchens, mess halls, command posts, disaster relief shelters, decontamination stations, holding cells, communication centers, laboratories, schools and the like. Portable shelters typically include one or more expandable and collapsible wall sections that allow the shelter to be selectively collapsed for storage and transportation of the shelter and that can be selectively expanded for deployment of the shelter. While such expandable wall sections for shelters are widely known, existing mechanisms for supporting, guiding, and moving the expandable wall sections are too heavy and complicated for certain shelter applications where weight reduction and ease of use are critical design considerations. As such, a need has been identified for a new and improved expandable wall shelter that includes a new and improved linkage for supporting and guiding the movable wall section relative to an adjacent portion of the shelter that allows the movable wall section to be extended/deployed and retracted/stowed manually by one or more people along a linear path without requiring hydraulics, pneumatics, electric motors, or other powered actuators and that otherwise provides superior overall results.

SUMMARY

In accordance with one aspect of the present development, an expandable wall shelter includes a body and a movable wall section connected to the body and movable between a retracted position and an extended position. At least one linkage assembly is operably connected between the body and the movable wall section for operably and movably supporting the movable wall section relative to the body for movement of the movable wall section to and between its retracted and extended positions. The at least one linkage assembly includes: (i) an inner link including opposite inner and outer ends; and (ii) an outer link including opposite inner and outer ends, wherein: the inner end of the inner link is pivotally connected to the body; the said outer end of the outer link is pivotally connected to the movable wall section; and, the outer end of the inner link is pivotally connected to the inner end of the outer link.

In accordance with another aspect of the present development, a linkage assembly for supporting an associated movable wall section for movement along a linear path between a retracted position and an extended position includes an inner link comprising opposite inner and outer ends, and an outer link comprising opposite inner and outer ends. The inner end of the inner link is adapted to be pivotally connected to an associated body for pivoting movement about a first pivot axis. The outer end of the outer link is adapted to be pivotally connected the associated movable wall section for pivoting movement about a second pivot axis. The outer end of the inner link is pivotally connected to the inner end of the outer link for pivoting movement about a third pivot axis. The first pivot axis, the second pivot axis, and the third pivot axis are all arranged parallel to each other for all positions of the linkage assembly. The first pivot axis, the second pivot axis, and the third pivot axis are all located in a first common reference plane when the linkage assembly is located in the retracted position corresponding to a retracted position of the associated movable wall section. The first pivot axis, the second pivot axis, and the third pivot axis are all located in a second common reference plane that is transversely oriented relative to the first common reference plane when the linkage assembly is located in an extended position corresponding to an extended position of the associated movable wall section. The inner link and the outer link define an angle (A) therebetween having a vertex coincident with the third pivot axis, wherein: (i) A=0 degrees when the linkage assembly is arranged in its retracted position; (ii) A=180 degrees when the linkage assembly is arranged in its extended position; and (iii) A is greater than 0 degrees and less than 180 degrees (0<A<180) when the linkage assembly is arranged in a partially extended position between the retracted position of the link assembly and the extended position of the link assembly.

DETAILED DESCRIPTION

Figure 1:
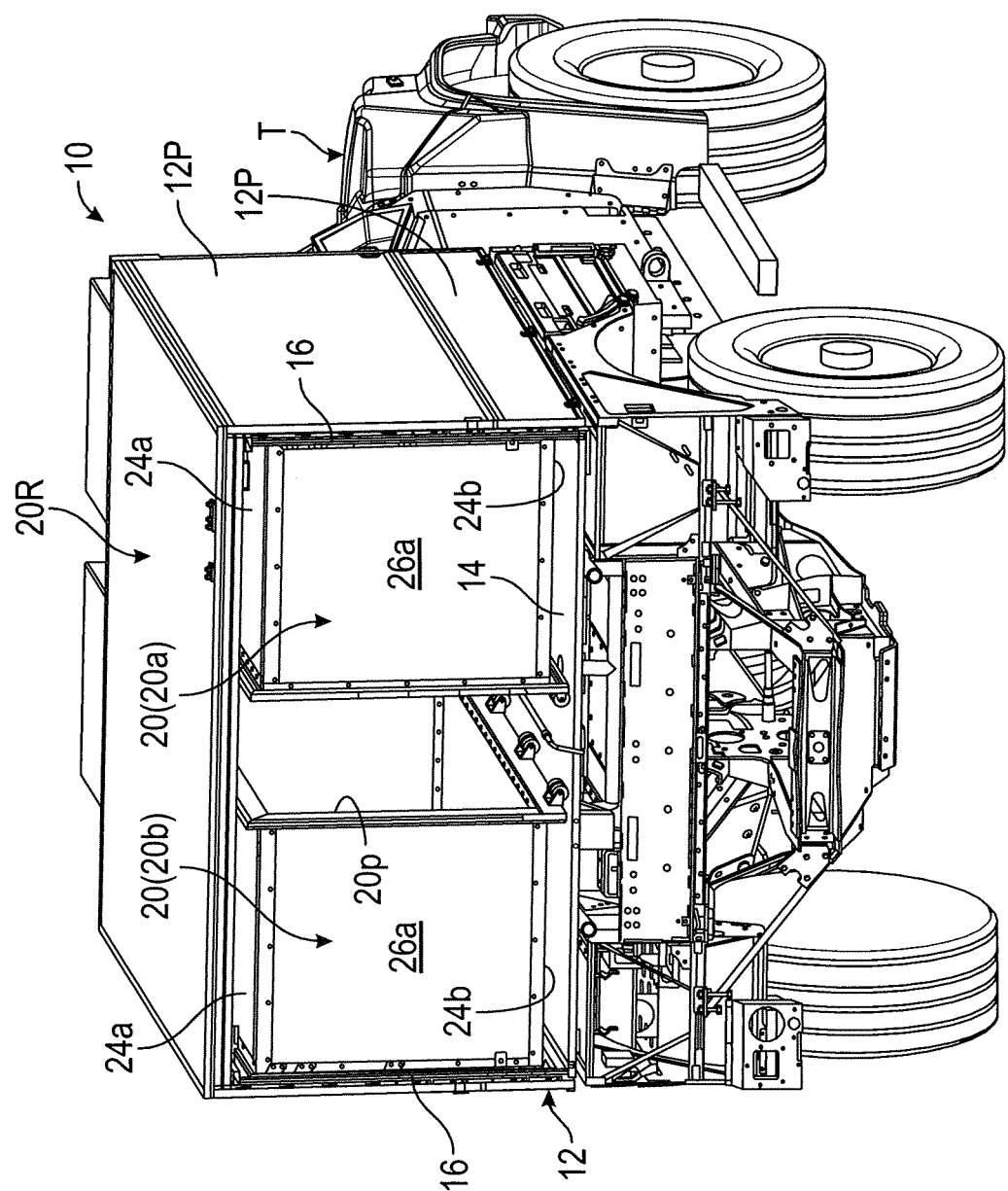
FIG. 1 illustrates one example of an expandable wall shelter formed in accordance with the present disclosure in its contracted or stored configuration and mounted on an optional vehicle.
Figure 2:
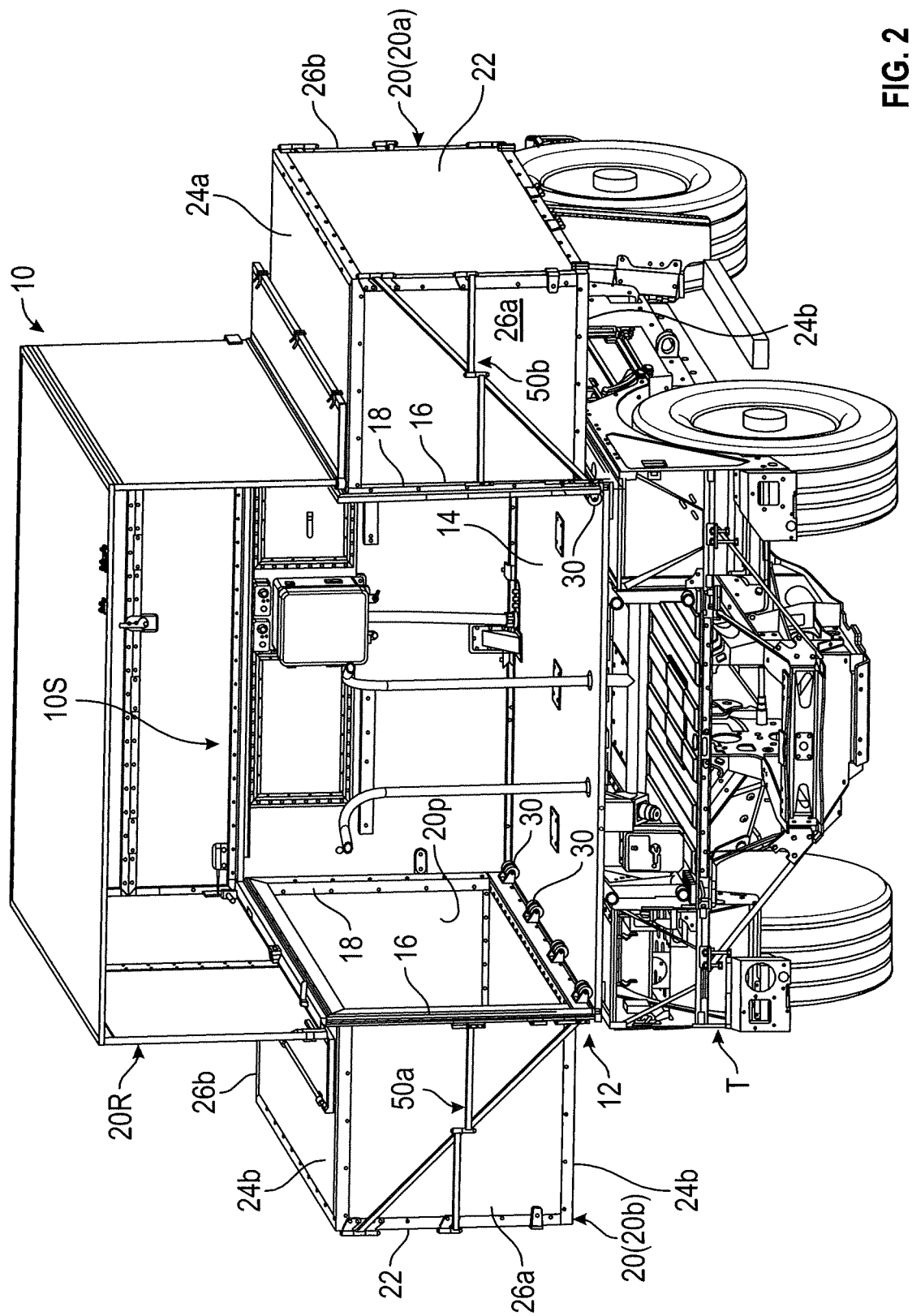
FIG. 2 partially illustrates the expandable wall shelter of FIG. 1 in its fully expanded or deployed configuration (with certain walls removed to reveal internal structures) with first (right) and second (left) expandable wall sections projecting laterally outward from the opposite first/right and left/second sides of the shelter.
Figure 3:
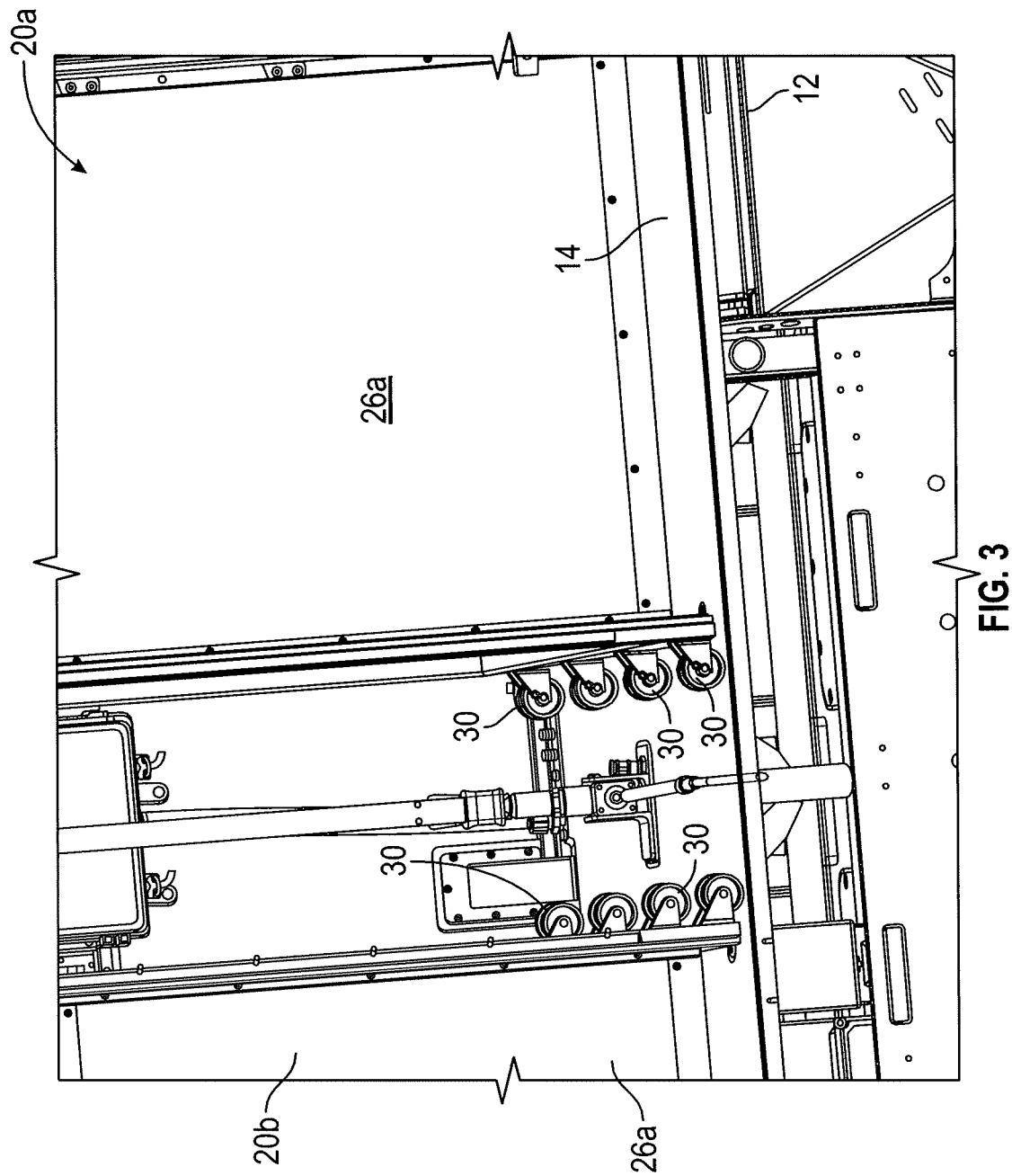
FIG. 3 is an enlarged, partial view that illustrates one example of a linear motion support system for each of the first and second expandable wall sections in accordance with an embodiment of the present disclosure, wherein the illustrated embodiment for each linear motion support system includes one or more rollers that movably support the respective expandable wall section relative to a floor or other support member or support surface of the shelter.

FIG. 1 illustrates one example of an expandable wall shelter 10 formed in accordance with the present disclosure in its contracted or stored configuration which is used for storage and transport. The shelter 10 is selectively arranged in an expanded or deployed configuration as shown in FIG. 2 such that it comprises an open internal space 10S that can be occupied by people and/or equipment. In the expanded configuration, one or more expandable wall sections 20 of the shelter 10 are moved from a retracted position as shown in FIG. 1 to an extended as shown in FIG. 2. The one or more movable wall sections 20 are movably supported relative to a shelter body 12 which, in the illustrated example, comprises at floor 14 and a primary frame 16 connected to the floor 14.

In the present example, a first (right) movable wall section 20a and second (left) wall section 20b each moves laterally or horizontally relative to the shelter body 12 between a respective retracted or stowed position (FIG. 1) and a respective extended or deployed position (FIG. 2). In their retracted positions, the wall sections 20 (20a,20b) are moved inwardly toward each other and are positioned at least flush with or can be retracted relative to the primary frame 16 of the shelter body 12. In their extended positions, the wall sections 20 are moved outwardly away from each other and project outwardly from the primary frame 16 of the shelter body 12. As shown herein, the shelter 10 also comprises a selectively extendable/deployable roof section 20R that is vertically expandable or extendable relative to the shelter body 12 between its retracted (stowed) position (FIG. 1) and its extended (deployed) position (FIG. 2). Although not shown in the present embodiment, those of ordinary skill in the art will recognize that the roof section 20R can be structured equivalently to the wall sections 20 described herein and in such embodiments can be considered a movable wall section 20. The retracted position of the roof section 20R reduces the vertical height of the shelter 10 for storage and/or transportation such as in an aircraft and/or on a land vehicle.

The shelter 10 can be a stand-alone structure intended to rest on the ground, a floor, or other support surface (see e.g., FIG. 6), or the shelter 10 can be connected to and supported by another structure or by a vehicle such as a trailer or a motorized vehicle such as a truck T as shown in FIG. 1. The first and second wall sections 20a,20b can be the same as each other as shown herein or different relative to each other in terms of their size, shape, and other features. For the purposes of the present disclosure, the wall sections 20a,20b can be considered equivalent, with like components of each being identified with like reference numbers/letters. In the following description, reference is made primarily to the first (right) movable wall section 20a (generally identified at 20) but those of ordinary skill in the art will recognize that the drawings and description apply equally to the second (left) movable wall section 20b except as otherwise shown and/or described herein.

Figure 5A:
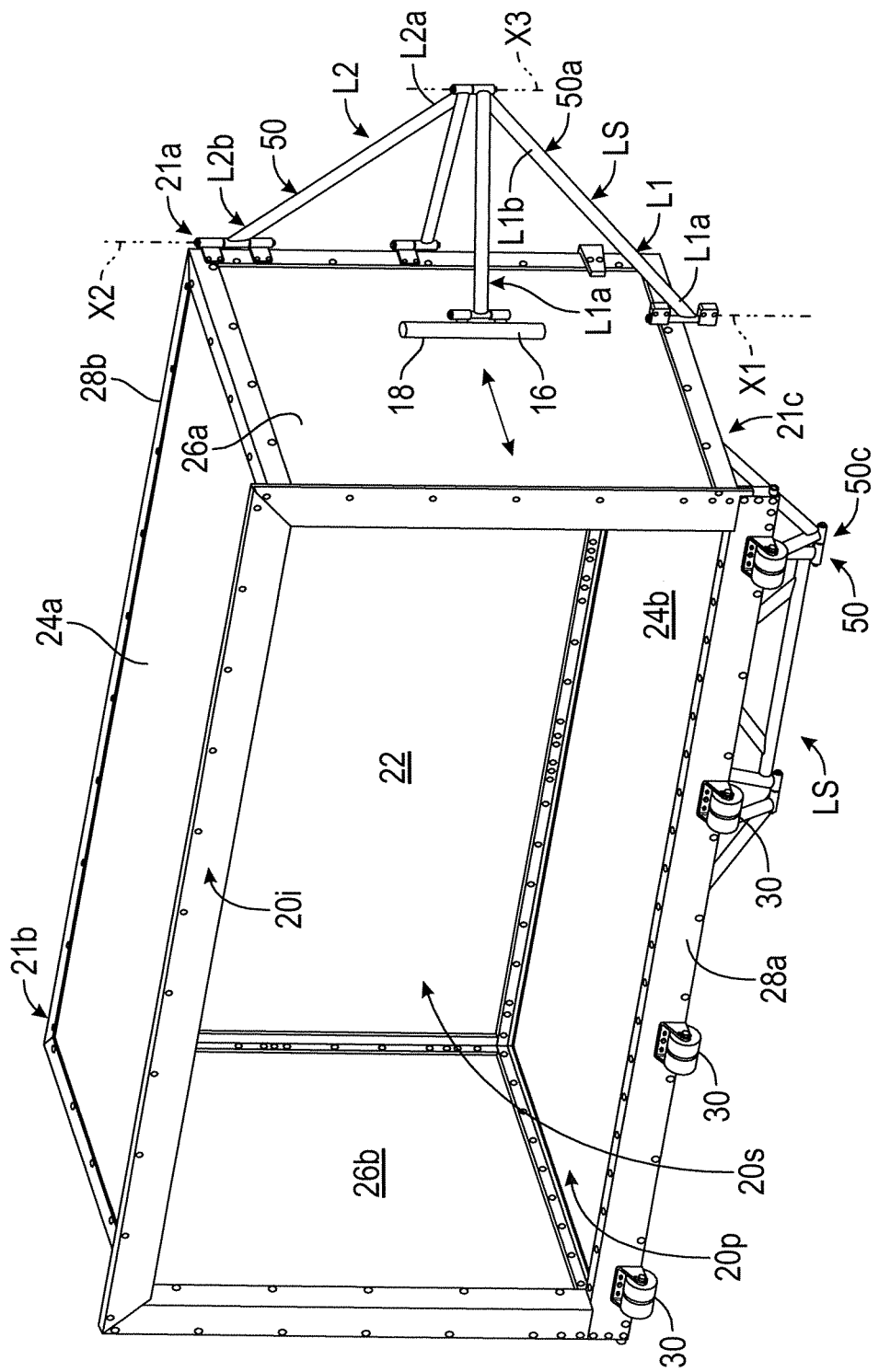
FIG. 5A is an isometric view of one of the expandable wall sections of FIGS. 1-4 in a partially expanded or partially extended position relative to a primary support frame of the shelter (the primary support frame is only partially shown to simplify the drawing)
Figure 5B:
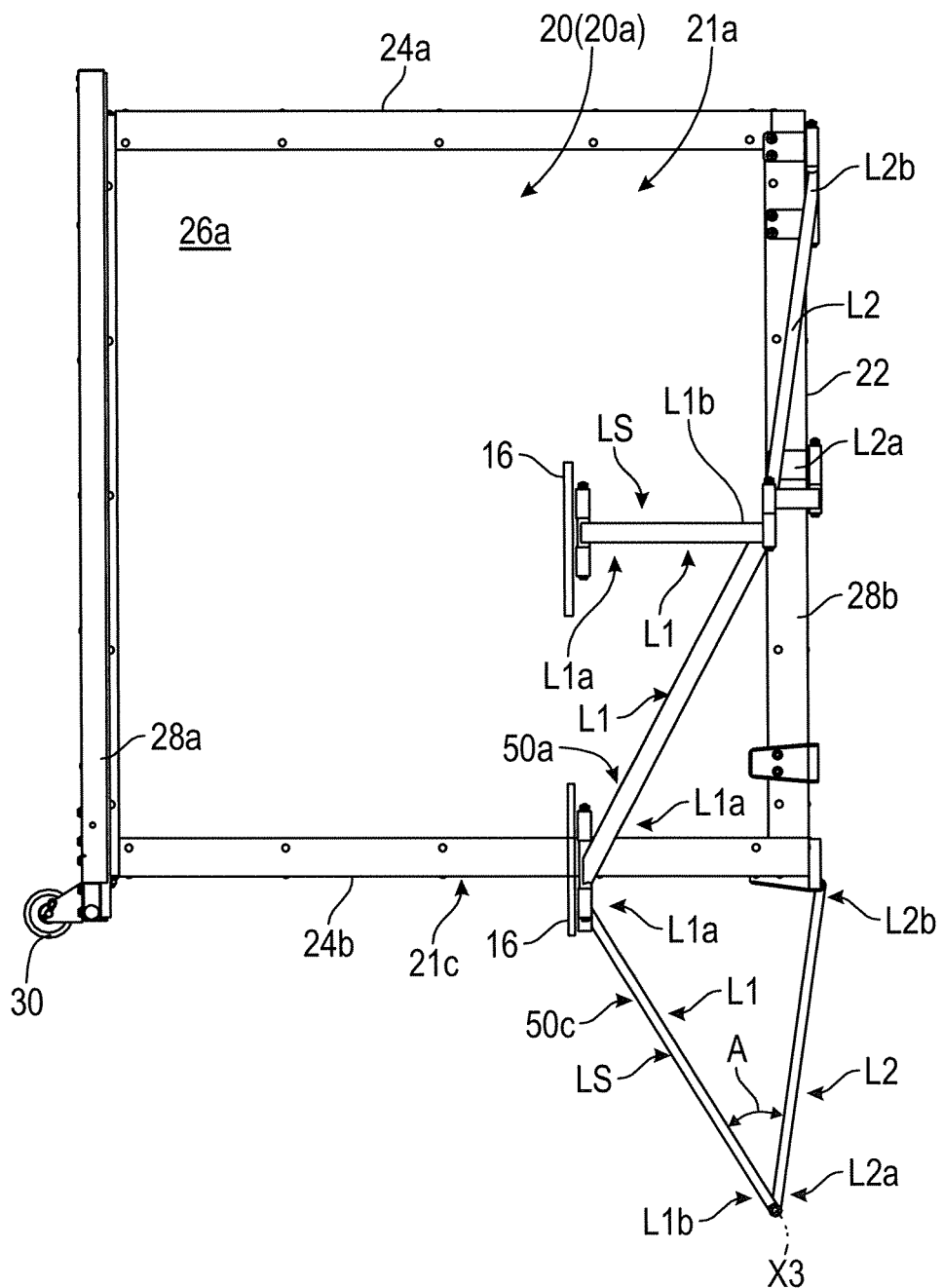
FIG. 5B is a left side view of the expandable wall section and partial frame of FIG. 5A.
Figure 5C:
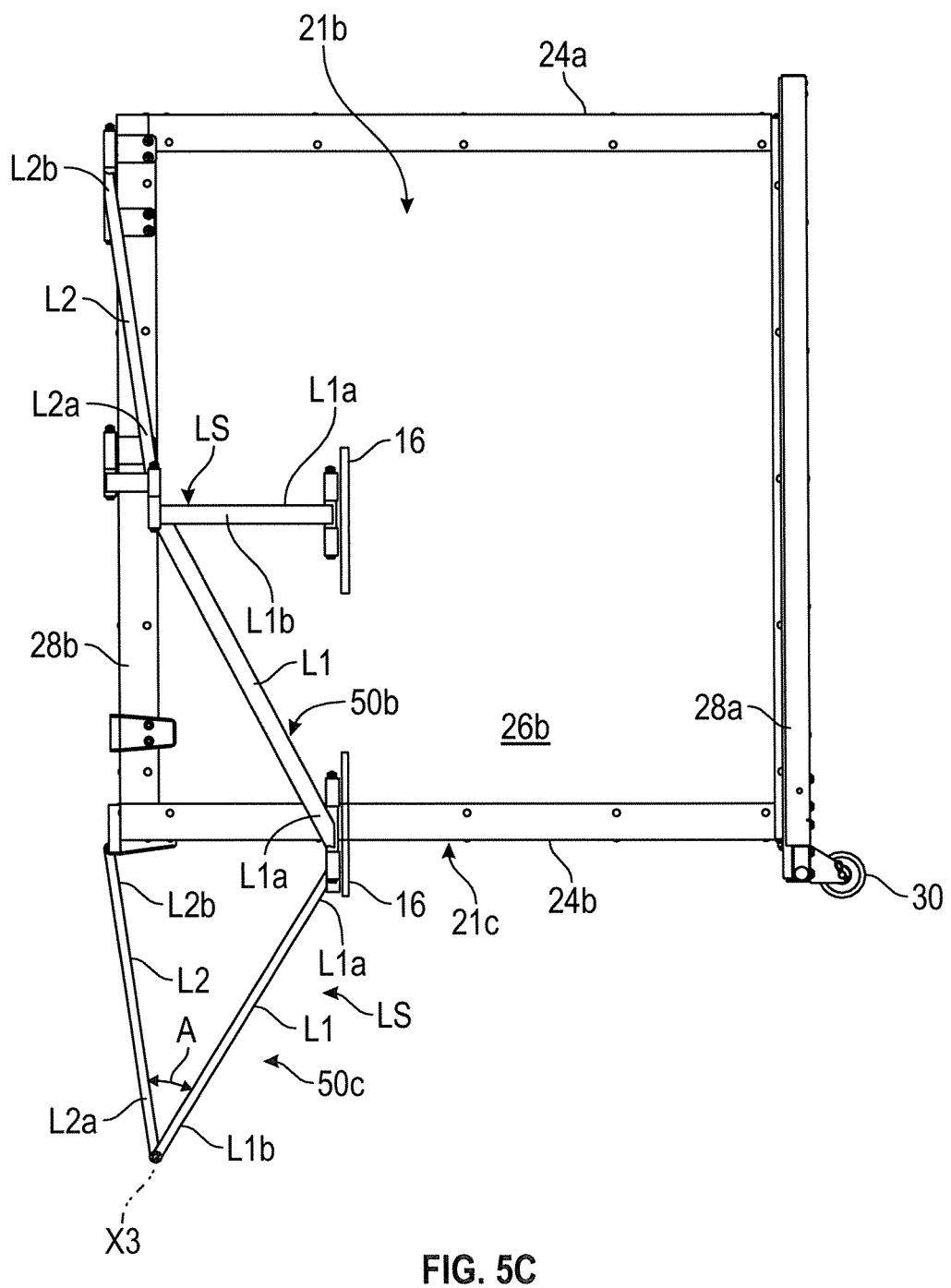
FIG. 5C is a right-side view of the expandable wall section and partial frame of FIG. 5A.
Figure 5D:
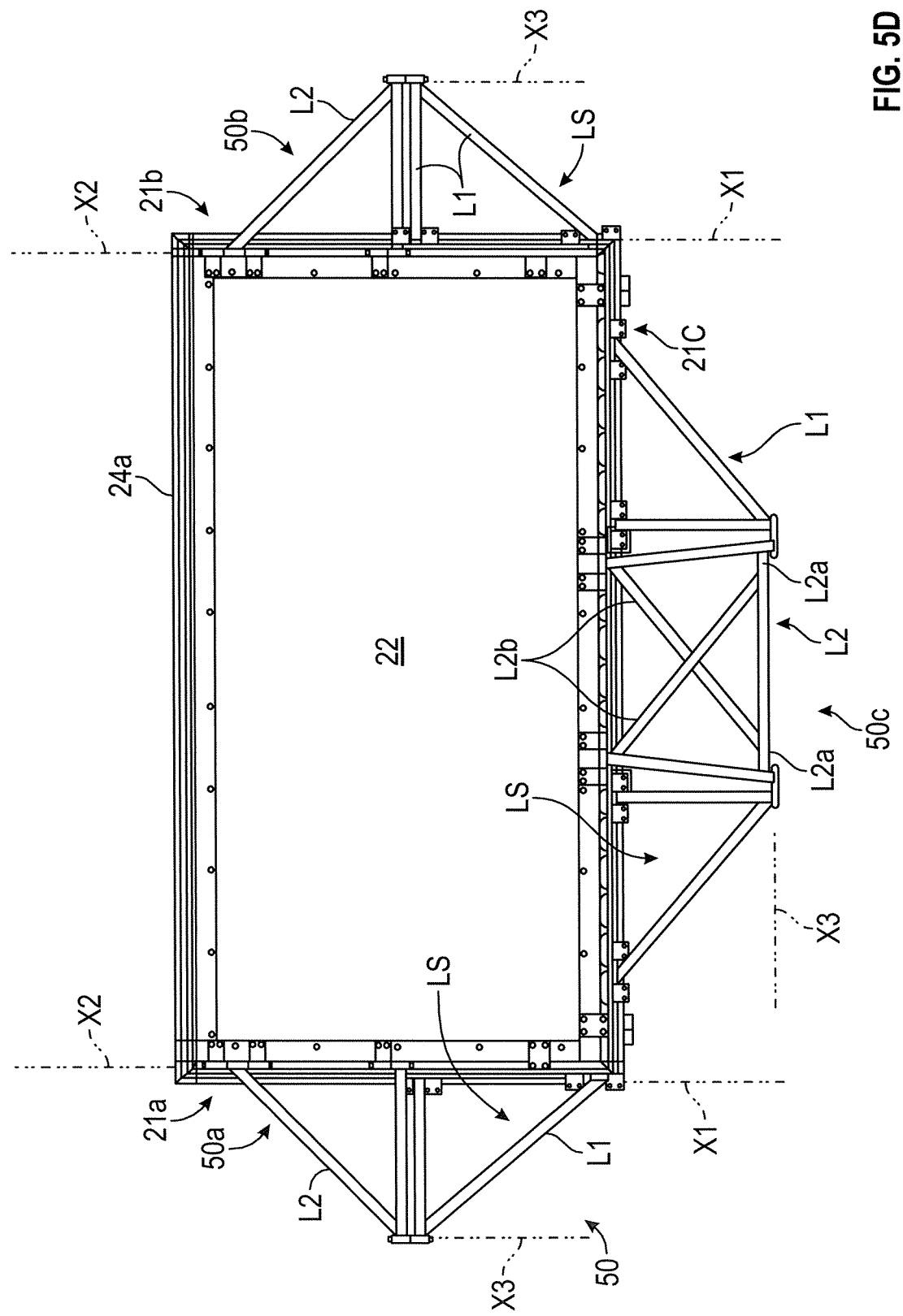
FIG. 5D is a front view of the expandable wall section of FIG. 5A.
Figure 5E:
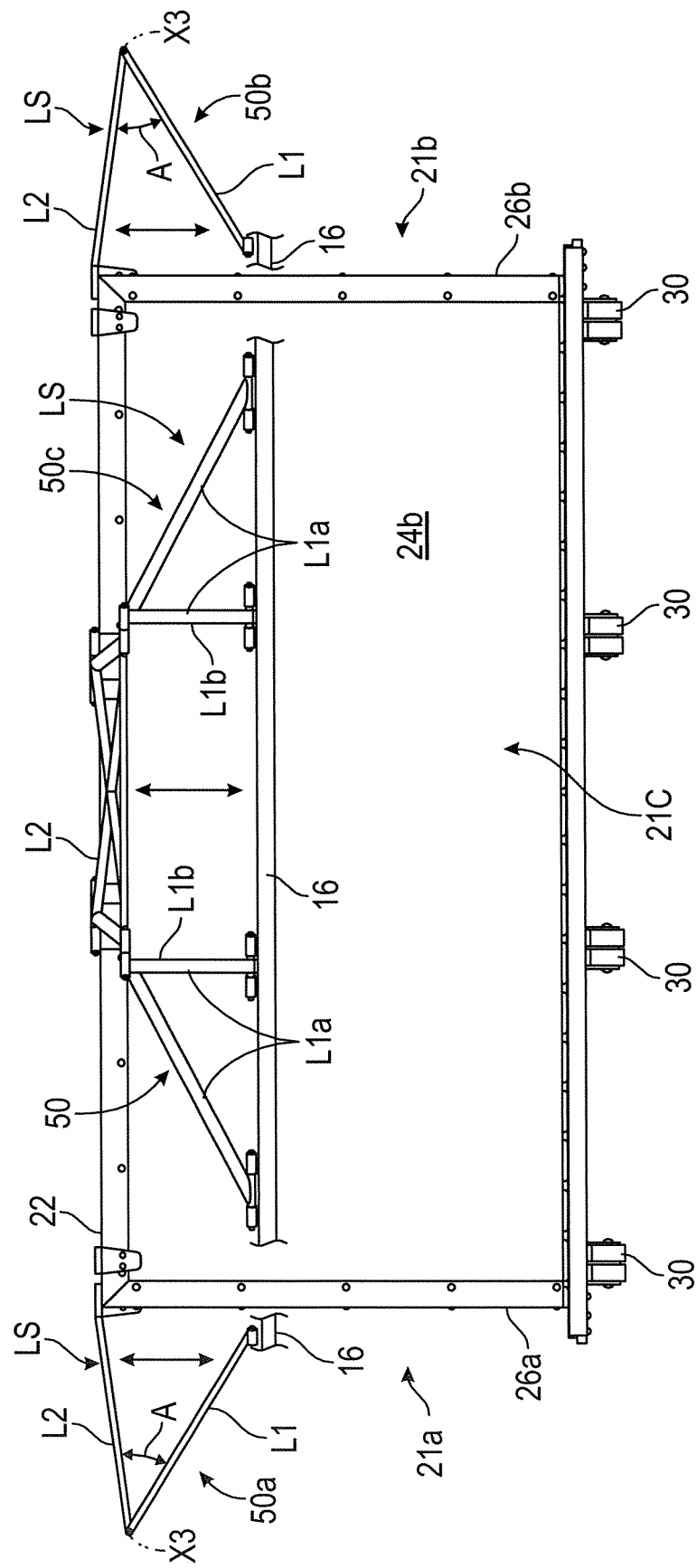
FIG. 5E is a bottom view of the expandable wall section and partial frame of FIG. 5A.

Although the movable wall sections 20 can comprise any desired shape and size, in the present example each movable wall section 20 comprises a box structure (see also FIG. 5A) including a vertical outer side wall 22, horizontal top and bottom walls 24a,24b connected respectively to the upper and lower horizontal edges of the outer side wall 22 and that are that are arranged in a parallel, spaced-apart relationship relative to each other, and first and second parallel, spaced-apart vertical end walls or side walls 26a,26b that are respectively connected to the first and second opposite ends of the outer side wall 22 and that also respectively extend between and interconnect the top and bottom walls 24a,24b at the opposite first and second ends thereof, respectively. Opposite the outer side wall 22, each movable wall section 20 comprises an opening 20p on an inner side 20i that opens into a hollow interior space 20s. Each movable wall section 20 comprises an inner frame 28a (FIG. 5A), such as the rectangular aluminum frame defined from a plurality of inner frame segments as shown in the present example, which extends around a periphery of the opening 20p. Each movable wall section 20 preferably also comprises an outer frame 28b (FIG. 5A) that extends around the periphery of the outer side wall 22, such as the illustrated aluminum frame 28b defined from a plurality of outer frame segments. Furthermore, the fixed body 12 of the shelter 10, on each of its first and second lateral sides, can comprise a main or primary frame 16 that at least partially defines and/or that lies adjacent the main or primary opening 18 in which the movable wall section 20 is located and through which the movable wall section 20 extends when moved to its extended position.

As noted, each movable wall section 20 is selectively movable relative to the shelter body 12 on a purely linear path between a retracted position (FIG. 1) and an extended position (FIG. 2). To facilitate this movement, each movable wall section 20 can comprise one or more wheels or rollers 30 or other rotatable elements such as bearings connected to the inner frame 28a and/or other location such as the bottom wall 24*b*, top wall 24*a*, and/or side walls 26*a*,26*b* and that are rotatably engaged with and roll on the floor 14 or other part of the body 12 to movably support the wall section 20 relative to the body 12. Additionally or alternatively, the linear motion support system can comprise one or more elongated tracks or rails connected to the shelter body 12 that rotatably support respective rollers 30 or that non-rotatably support respective non-rotatable sliding members such as metallic and/or polymeric slide blocks connected to the movable wall section 20. Also, the disclosed arrangements can be reversed such that one or more rotatable rollers or bearings, or non-rotatable slide blocks are connected to the shelter body 12 and engage the movable wall section 20.

Referring now particularly to FIGS. 4 and 5A-5E, each movable wall section 20 is further movably supported relative to the body 12 for movement between the retracted and extended positions by a linkage system LS comprising at least one and typically at least two linkages or linkage assemblies 50*a*,50*b*,50*c* (sometimes individually referred to herein as a "linkage 50" or "linkage assembly 50" or collectively as "linkages 50" or "linkage assemblies 50") that are each operably connected between the primary frame 16 or other part of the body 12 and the movable wall section 20 and that each operably and movably connect and support the movable wall section 20 relative to the body 12 for movement of the movable wall section 20 to and between its retracted and extended positions. As shown in the present example, the linkage system LS comprises first and second lateral linkage assemblies 50*a*,50*b* located respectively on or adjacent the opposite first and second lateral sides 21*a*,21*b* of the movable wall section 20. The illustrated linkage system LS further comprises a third linkage assembly 50*c* located adjacent or under a lower side 21*c* of the movable wall section 20. As explained in detail below, the one or more linkage assemblies 50 (50*a*,50*b*,50*c*) cooperate to provide a linkage system LS that supports and guides the movable wall section 20 as it moves between its retracted and extended positions relative to the primary frame 16 or other part of the shelter body 12. The linkage assemblies 50 are preferably defined from a metal such as aluminum, steel, stainless steel or similar, but they can alternatively be defined from or include portions defined from non-metallic materials such as polymeric and/or composite materials. The linkage assemblies 50 support the movable wall section 20 for movement along a purely linear path as the movable wall section moves between its retracted and extended positions. The installed positions of the linkage assemblies 50 as described herein, the pivot axes, and other structure features described in the present specification ensure: (i) the linkages 50 support the entire weight of the movable wall section 20, except for the portion of such weight that is supported by the rollers 30; the translation of the movable wall section 20 from its stowed (retracted) position to its deployed (extended) position and vice versa is a purely linear (typically horizontal) motion that eliminates any pitch, roll, or yaw of the movable wall section 20 while it moves, without requiring any large, heavy linear slides, rack and pinion systems, and/or other translation devices. This linear movement of the movable wall section 20 ensures that equipment located inside the space 20*s* of the movable wall section 20 is maintained in its intended orientation (typically horizontal) without pivoting or other non-linear movement as could lead to damage or other undesired movement of such equipment.

Figure 6:
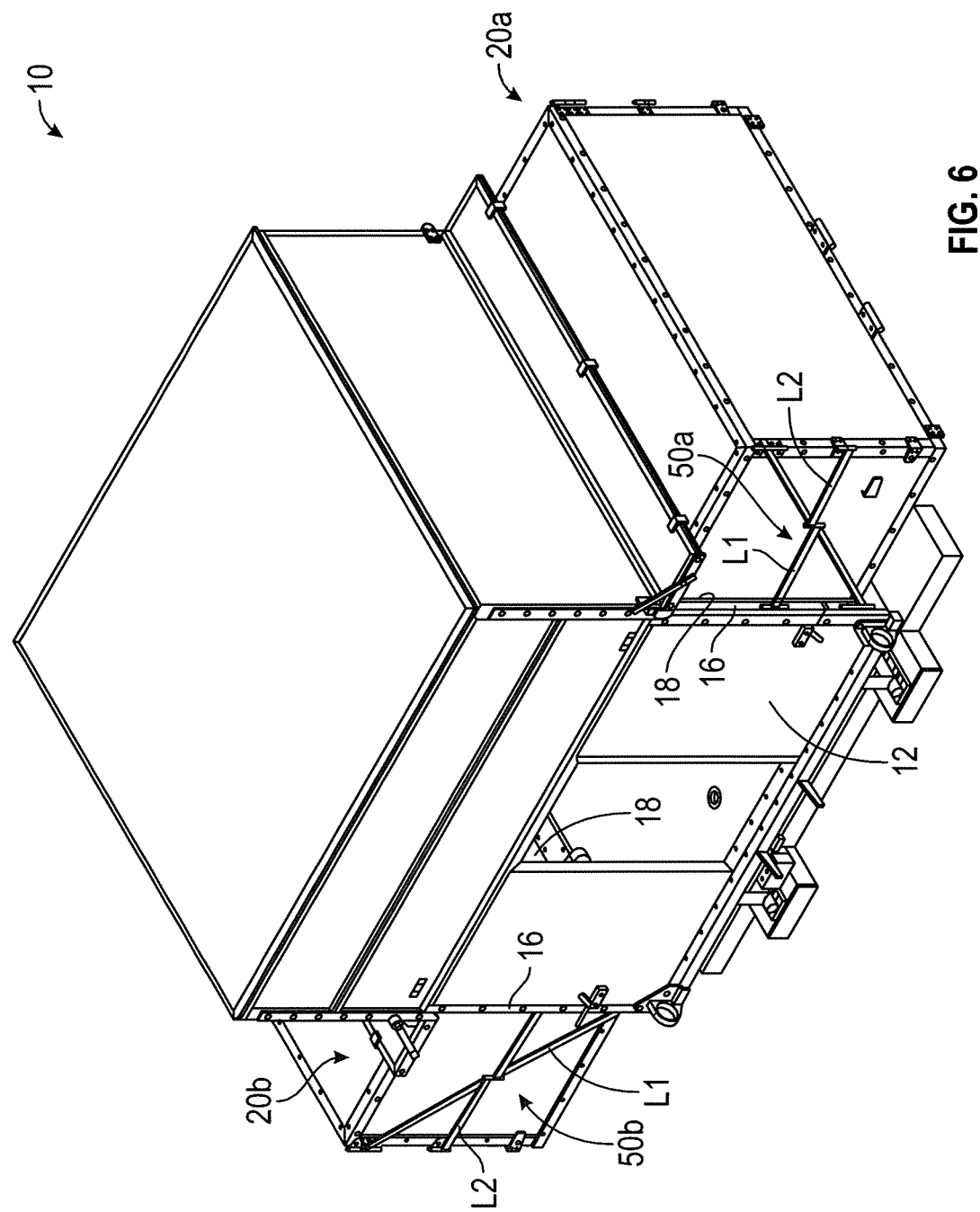
FIG. 6 is an isometric view of a shelter provided in accordance with an embodiment of the present development in its deployed condition.
Figure 7:
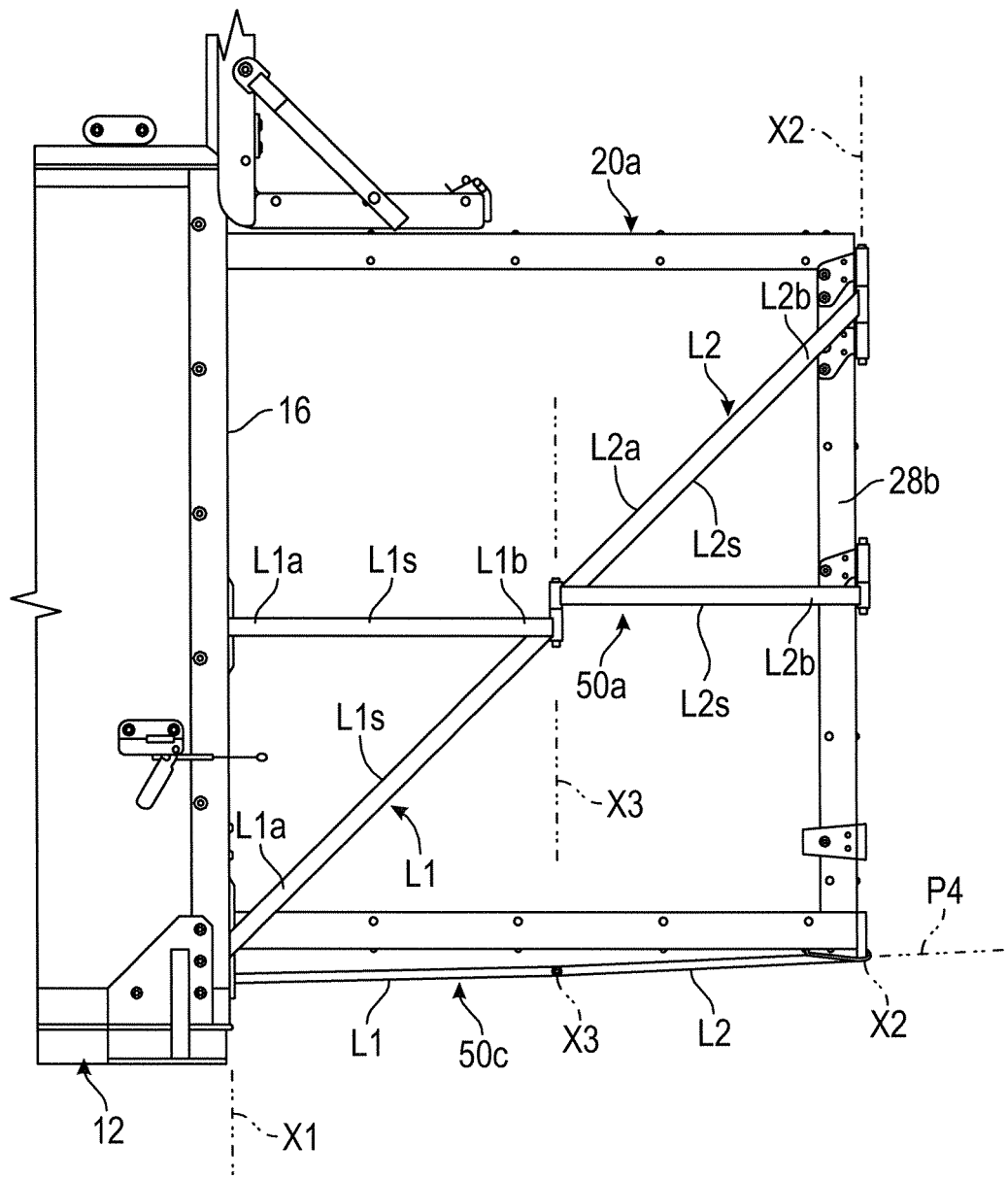
FIG. 7 is a partial left side view of the shelter of FIG. 6 showing a movable wall section and a linkage system for movably supporting the movable wall section.
Figure 8:
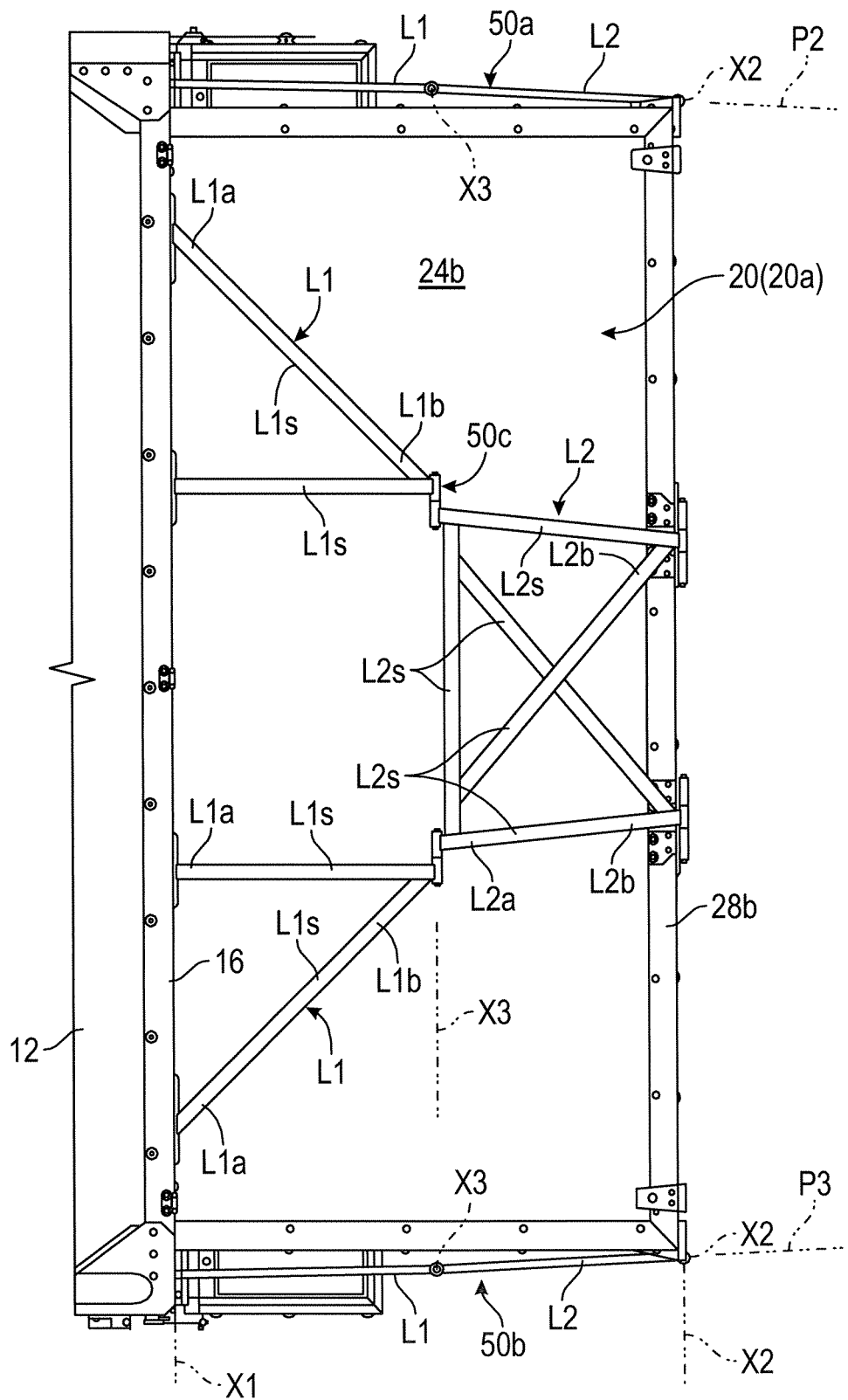
FIG. 8 is a partial bottom view of the shelter of FIG. 6 showing a movable wall section and a linkage system for movably supporting the movable wall section.

FIG. 6 shows the shelter 10 separate from the truck vehicle T, and FIGS. 7 & 8 show enlarged portions of the shelter 10. The structure and operation of the linkage system LS and the linkage assemblies 50 thereof is explained further with continuing reference to FIGS. 5A-5E and also FIGS. 6-8. Each linkage assembly 50 (50*a*,50*b*,50*c*) generally comprises at least one inner link L1 including opposite inner and outer ends L1*a*,L1*b*. Each linkage assembly 50 (50*a*,50*b*,50*c*) further comprises at least outer inner link L2 including opposite inner and outer ends L2*a*,L2*b*. The inner end L1*a* of each inner link L1 is pivotally connected to the primary frame 16 and/or other part of shelter body 12 adjacent the primary frame or elsewhere for rotation about an inner pivot axis X1. The outer end L2*b* of each outer link L2 is pivotally connected to the outer frame 28*b* and/or other part of movable wall section 20 at a location spaced outwardly from its open inner side 20*i* for rotation about an outer pivot axis X2. The inner and outer links L1,L2 are pivotally connected together between the inner and outer pivot axes X1,X2, with the outer end L1*b* of the inner link L1 being pivotally connected to the inner end L2*a* of the outer link L2 for rotation about an intermediate pivot axis X3. For each particular linkage assembly 50, the inner, outer, and intermediate pivot axes X1,X2,X3 are all parallel with respect to each other for all operative positions of the movable wall section 20 relative to the body 12 including the retracted and extended positions and all intermediate positions, but the orientation of the first, second, and third axes X1,X2,X3 can vary depending upon the installed orientation of the linkage assembly 50. The inner, outer, and intermediate pivot axes X1,X2,X3 can be vertically oriented for the linkage assemblies 50*a*,50*b* and can be horizontally oriented for the linkage assembly 50*c* as shown in the illustrated embodiment.

More particularly, the inner end L1*a* of each inner link L1 is pivotally connected to the shelter body 12 adjacent the primary opening 18 through which the movable wall section projects such as being pivotally connected to the primary frame 16 as shown herein. Each inner link L1 can include or be defined from one or more inner link struts L1*s* (FIG. 7) that are welded, fastened, or otherwise interconnected or formed together as a one-piece structure to construct the inner link L1. As shown herein, the one or more inner links L1 preferably each include at least two (first and second) inner link struts L1*s* that are arranged relative to each other and connected to the primary frame 16 or other part of the shelter body 12 to define at least one triangular structure for providing added strength to the linkage assembly 50 such that the linkage assembly 50 rotates/pivots under load without deflecting or deforming.

Similarly, the outer end L2*b* of each outer link L2 is pivotally connected to the movable wall section 20 such as being pivotally connected to the outer frame 28 or other part of the movable wall section adjacent the periphery of the outer side wall 22 or elsewhere space outwardly from the open inner side 20*i* of the wall section 20. Each outer link L2 can also include or be defined form one or more outer link struts L2*s* (FIG. 7) that are welded, fastened, or otherwise interconnected or formed as a one-piece structure to construct the outer link L2. As with the inner link(s) L1, the one or more outer links L2 preferably each include at least two (first and second) outer link struts L2*s* that are arranged relative to each other and connected to the primary frame 16 or other part of the shelter body 12 to define at least one triangular structure for providing added strength to the linkage assembly 50 such that the linkage assembly 50 rotates/pivots under load without deflecting or deforming.

As shown in the bottom view of FIG. 8 for the linkage assembly 50*c*, a linkage assembly 50 can include multiple inner links L1 and/or multiple outer links L2 such as the illustrated linkage assembly 50*c* which includes two inner links L1 (each comprising two inner link struts L1s) and one outer link L2 located between the two inner links L1 (and comprising five outer link struts L2s). The illustrated example is not intended to be limiting in any way.

Figure 4:
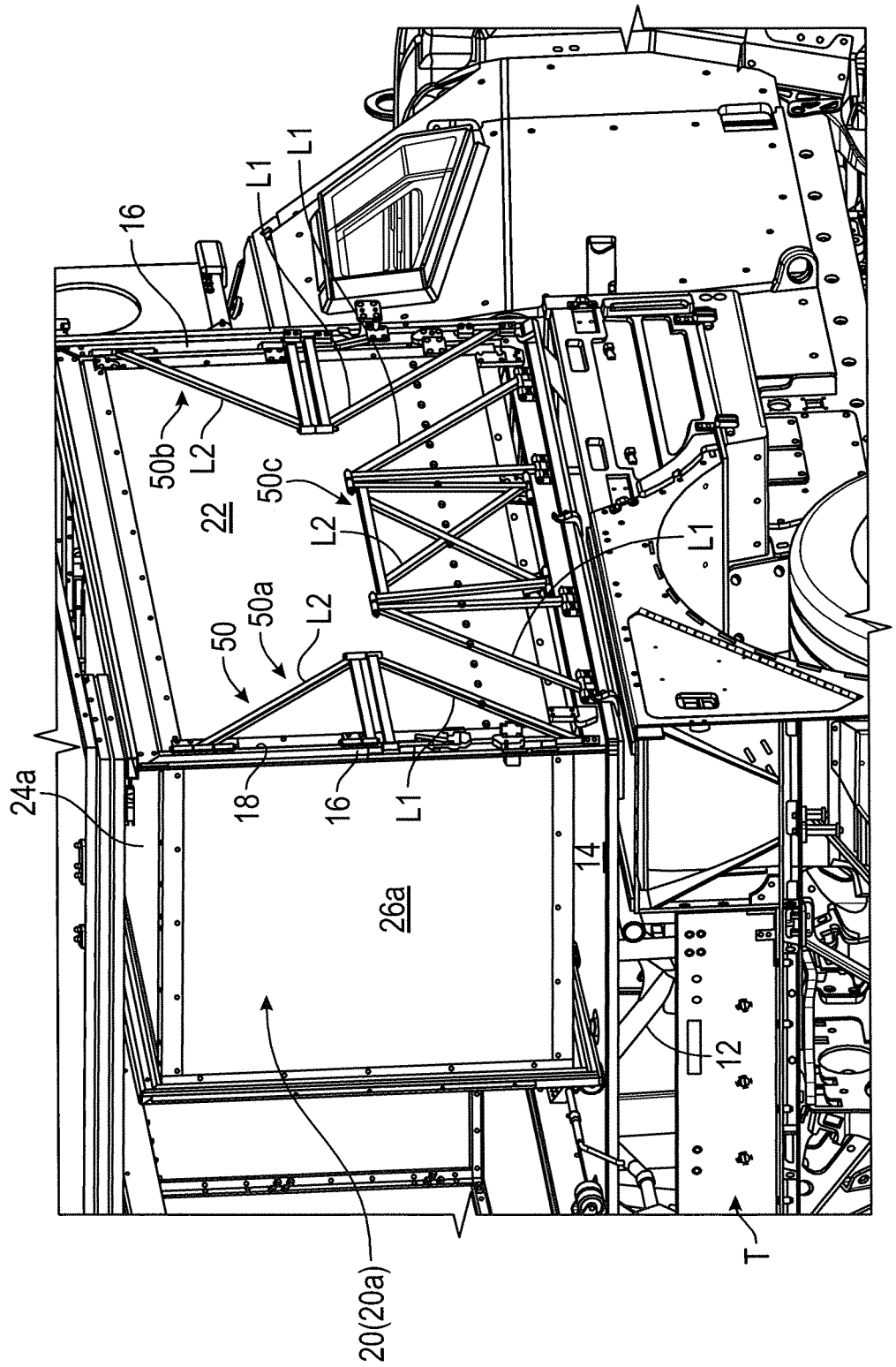
FIG. 4 is a partial right side isometric view of the shelter of FIG. 1 in its stored/contracted configuration with outer wall sections removed to reveal an expandable wall section support linkage system formed in accordance with an embodiment of the present disclosure.
Figure 9:
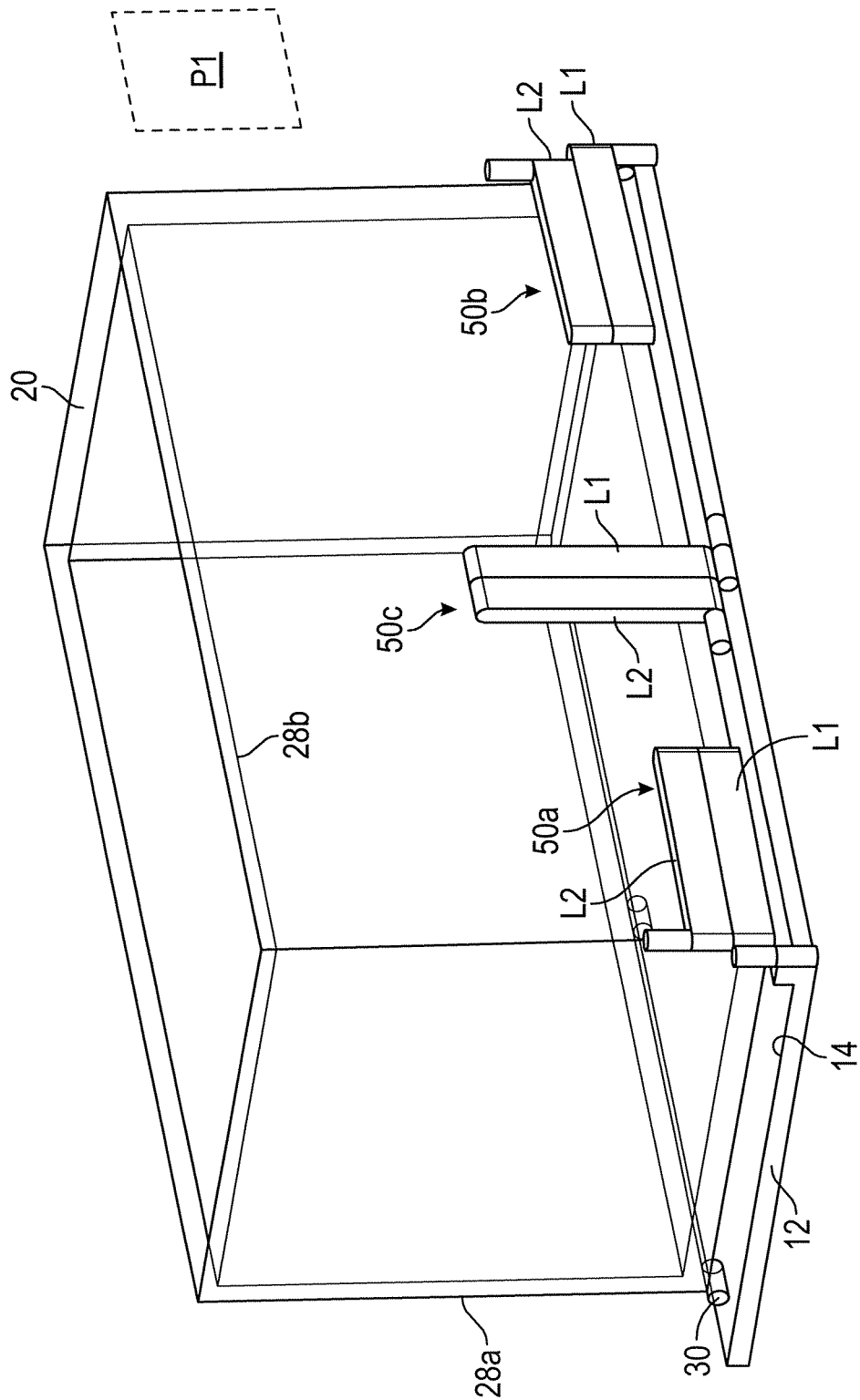
FIG. 9 is a partial diagrammatic illustration of a shelter provided in accordance with an embodiment of the present development including a movable wall section in its retracted or stowed position with its linkage system folded into a fully retracted or stowed position.
Figure 10:
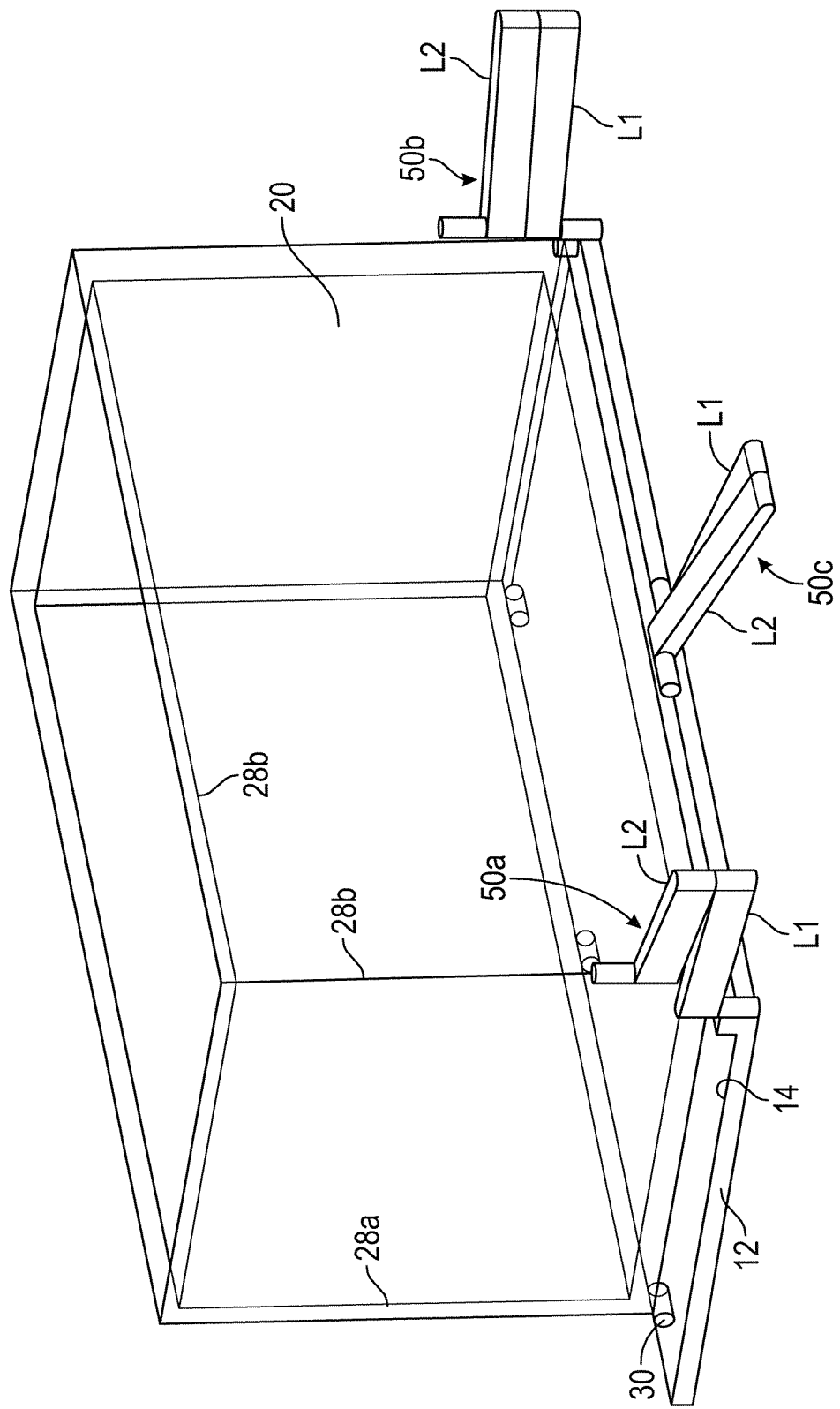
FIG. 10 is similar to FIG. 9 but shows the linkage system moved from its fully retracted/stowed position to a partially extended or partially deployed position.

As shown in FIG. 4 and also diagrammatically shown in FIG. 9, for each linkage 50 (50a,50b,50c), the inner and outer links L1,L2 are connected respectively to the shelter body 12 and to the movable wall section 20 such that when the movable wall section 20 is moved to its retracted or stowed position in which the outer wall 22 is adjacent and flush with the primary frame 16, the inner and outer links L1,L2 move to a fully folded or fully retracted position in which the inner and outer links L1,L2 and also the inner, outer, and intermediate pivot axes X1,X2,X3 of each linkage assembly 50 (50a,50b,50c) are arranged in a co-planar relationship in a reference plane P1 (FIG. 9) that lies parallel to the outer wall 22 of the movable wall section 20 in the illustrated example. Preferably, in this fully folded configuration, the linkage assemblies 50 and both the inner and outer links L1,L2 thereof, are arranged parallel to and are abutted with or contact and/or at least lie adjacent the outer wall 22 of the movable wall section 20 for compact storage. Furthermore, in this folded configuration, all of the multiple inner, outer, and intermediate pivot axes X1,X2,X3 for all of the linkages 50 (50a,50b,50c) are arranged co-planar with each other in the single reference plane P1 that can be parallel with the outer wall 22. When in this fully folded configuration, the linkages 50 act to restrain the movable wall section 20 in its retracted/stowed position, and it can be necessary for a user to manually pivot one or more of the linkages 50 about its inner and outer pivot axes X1,X2 outwardly away from the movable wall section 20 to a partially unfolded or partially extended position to release the movable wall section 20 from its retracted/stowed position as diagrammatically shown in FIG. 10.

Figure 11:
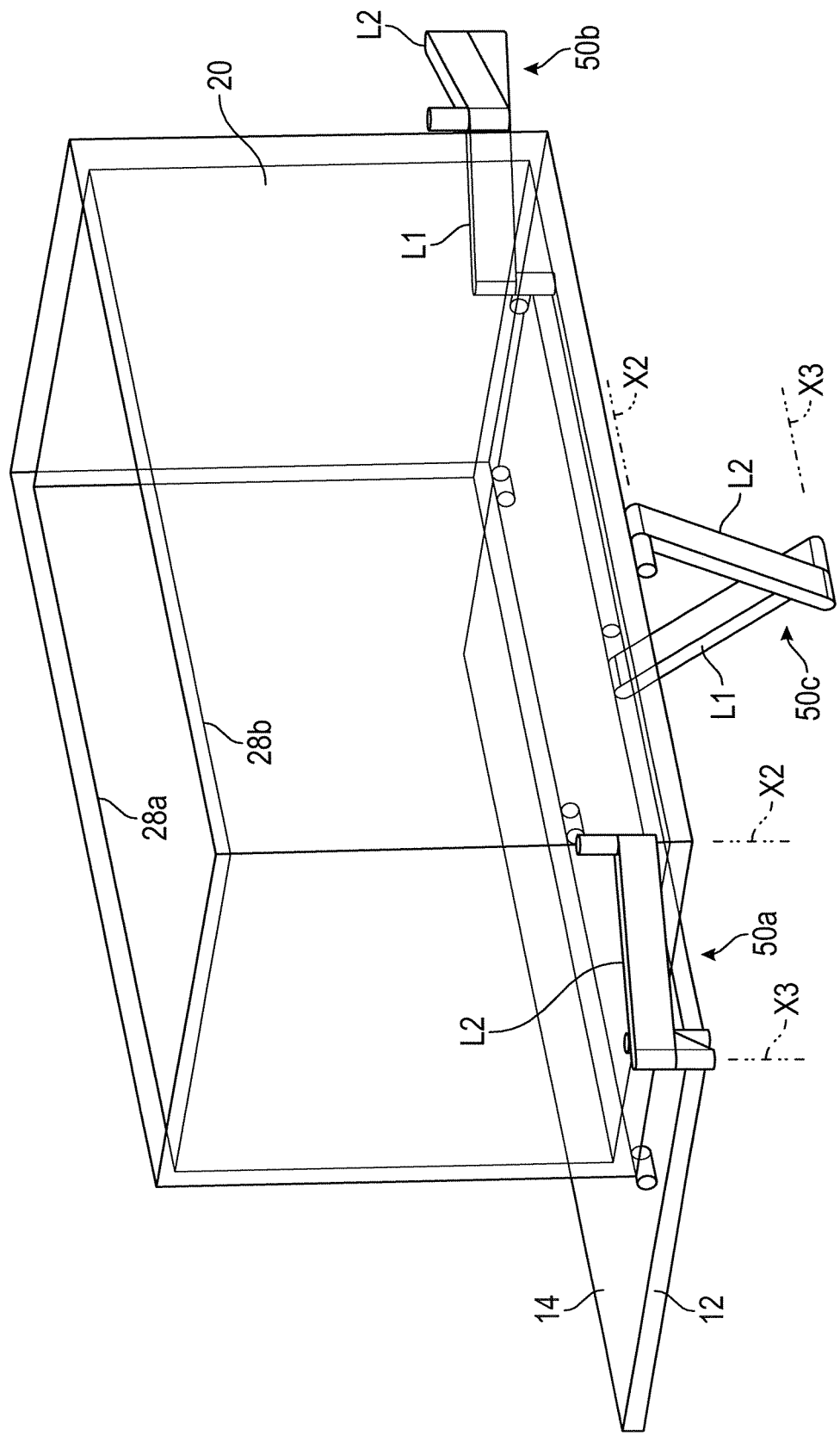
FIG. 11 is similar to FIG. 9 but shows both the moveable wall section and linkage system in partially extended or partially deployed positions.

With reference now again to FIGS. 5A-5E, when the movable wall section 20 is moved outwardly away from the shelter body 12 through the main opening 18 to a partially extended or intermediate position relative to the primary frame 16 where the movable wall section is located between the retracted position and the extended position, the linkage assemblies 50 (50a,50b,50c) are each also moved to a partially extended position in which the inner and outer links L1,L2 of each linkage 50 define a non-zero internal angle A (FIGS. 5B, 5C, 5E) with the vertex of each respective angle A being coincident with the intermediate pivot axis X3. In this partially extended position of the movable wall section which corresponds to a partially extended or partially opened position of the linkages 50, the magnitude of the included angle A defined between the inner and outer links L1,L2 is greater than 0 degrees and less than 180 degrees, i.e., 0°<A<180°. FIG. 11 diagrammatically illustrates the partially extended positions of the movable wall section 20 and linkage assemblies 50.

Figure 12:
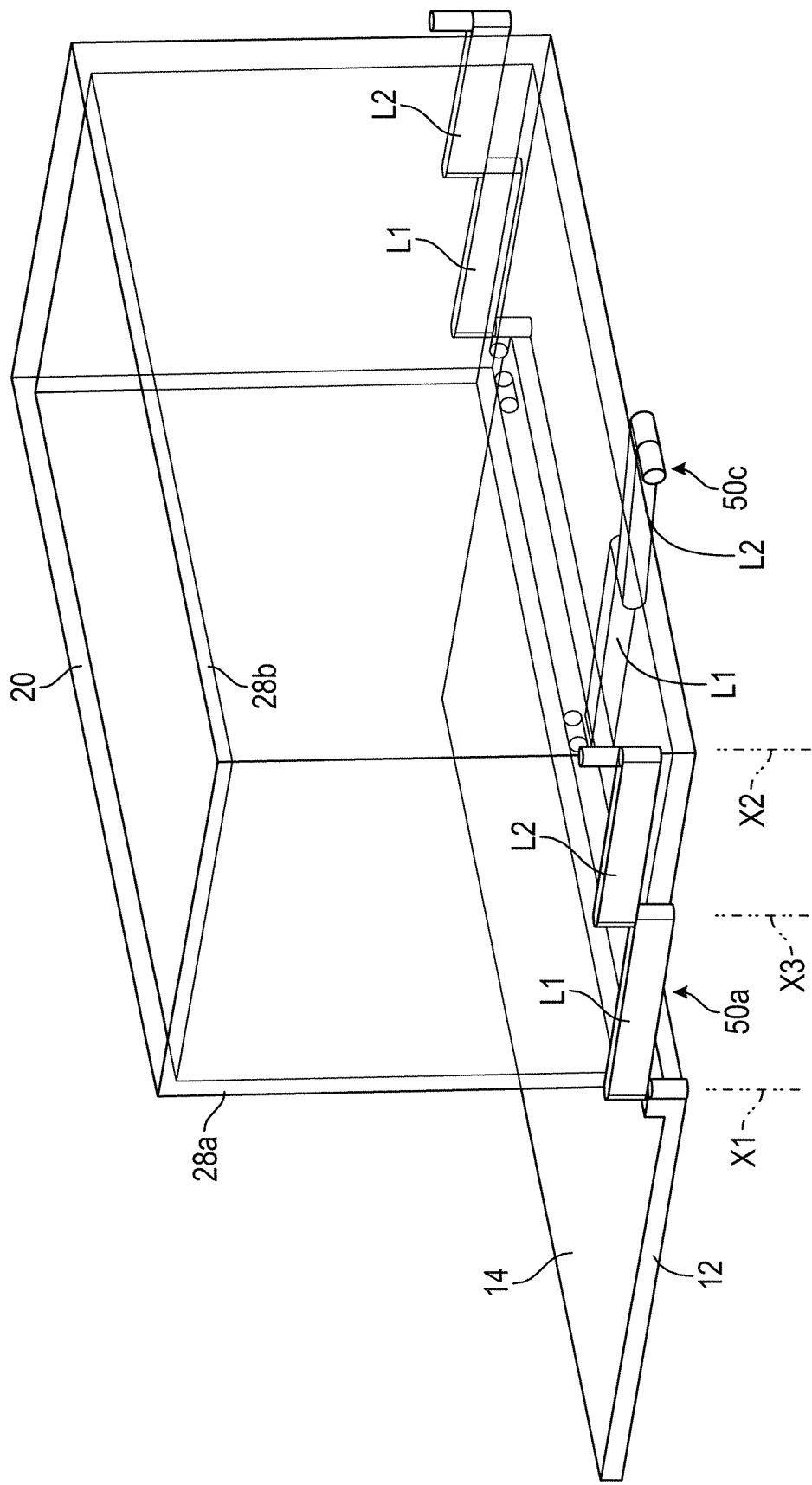
FIG. 12 is similar to FIG. 9 but shows both the moveable wall section and linkage system in fully extended or fully deployed positions.

Upon further extension of the movable wall section 20 outwardly away from the primary frame 16 or other part of the shelter body 12, the angle A increases preferably until it reaches at least 180 degrees (A=180°) at which state the movable wall section 20 and each linkage assembly 50 (50a,50b,50c) is located in its fully extended position as shown in FIGS. 2 and 6-8 and also diagrammatically in FIG. 12. In this extended position of the movable wall section 20 when the angle A is equal to 180 degrees (A=180°), each linkage assembly 50 (50a,50b,50c) will be arranged such that the inner and outer links L1,L2 and also the inner, outer, and intermediate pivot axes X1,X2,X3 all lie in a respective common reference plane as shown in FIG. 8 at P2,P3 (for the linkage assemblies 50a,50b) and in FIG. 7 at P4 (for the linkage assembly 50c). The reference planes P2,P3, and P4 are each transversely oriented relative to the first reference plane P1. When the movable wall section 20 is located in its extended position, the inner and outer links L1,L2 of the first and second linkage assemblies 50a,50b are located respectively adjacent the opposite first and second lateral sides 26a,26b of the movable wall section 20, and the inner and outer links L1,L2 of the third linkage assembly 50c are located respectively adjacent or under the bottom wall 24b of the movable wall section 20. In some embodiments, one or more of the linkages 50 (50a,50b,50c) can go "over-center" such that the angle A is greater than 180 degrees (A>180°) in which case such linkage 50 will act to hold the movable wall section 20 in its extended position and will resist retraction of the movable wall section 20 until a user manually moves inner and outer links L1,L2 and the pivot axis X3 outwardly away from the movable wall section 20 to a position where the internal angle A is less than 180 degrees (A<180°) to allow the movable wall section 20 to retract toward the primary frame 16 and remainder of the shelter body 12 toward and/or into its fully retracted/stowed position in a reverse of the above-described extension process. In particular, the third linkage assembly 50c provides an effective and convenient structure for manually moving the movable wall section 20 to and between its retracted and extended positions in that a user can: (i) grasp the third linkage assembly 50c when the movable wall section is in its retracted position (FIGS. 4 & 9) and pivot the third linkage assembly 50c about its first and second pivot axis X1,X2 so that it moves outwardly away from the outer wall 22 of the movable wall section 20 and pivots downward so as to be located under the bottom wall 24b of the movable wall section 20 as the movable wall section moves from its retracted position (FIGS. 4 & 9) to its extended position (FIGS. 7 & 12). The third pivot axis X3 can move over-center such that the internal angle A is greater than 180 degrees (A>180°) which locks the movable wall section 20 in its extended position. To stow the movable wall section 20, the process just described is reversed by first manually pulling on the third linkage assembly 50c to move the third pivot axis X3 down and away from the bottom wall 24b of the movable wall section 20 and then pivoting the third linkage assembly 50c around its first and second pivot axes X1,X2 so that it moves up and around the movable wall section 20 until the third linkage assembly 50c lies adjacent the outer wall 22 of the movable wall section 20 as shown in FIGS. 4 & 9.

Those of ordinary skill in the art will recognize that the pivoting movement of the linkage assemblies 50 (50a,50b, 50c) during extension and retraction of the movable wall section 20 requires sufficient clearance or open space adjacent the linkage assembly/shelter 10 for each linkage assembly 50 and its intermediate pivot axis X3 to swing without interference on an arc between its various operative positions as described herein. For example, such clearance can be provided to exceed the maximum of the lengths of the inner and outer links L1,L2.

Although the linkage assemblies 50 (50a,50b,50c) and the movable wall sections 20 are described herein as being manually movable, one or more of the linkage assemblies 50 and/or the movable wall sections 20 can be operatively connected to and selectively moved between the above-described extended and retracted positions by a motor, spring, and/or other optional actuator provided as part of the shelter 10 and operatively connected to one or more of the linkage assemblies 50 and/or movable wall sections 20.

The extended movable wall section 20 can be latched in its extended and retracted positions using one or more latches connected to the shelter body 12 and/or movable wall section 20. Also, when the movable wall section 20 is fully retracted into the main opening 18, the movable wall section 20 can be covered or partially covered by one or more movable exterior wall panels 12P of the shelter body 12 as shown in FIG. 1 to further secure the movable wall section 20 in its retracted or stowed position and to cover and protect the linkages 50 during storage and transport of the shelter 10. In one embodiment, the exterior panels 12P are provided by the side walls and/or other parts of the movable roof section 20R when the movable roof section 20R is retracted.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. An expandable wall shelter comprising:
    a body;
    a movable wall section connected to the body and movable between a retracted position and an extended position;
    at least one linkage assembly operably connected between the body and the movable wall section for operably and movably supporting the movable wall section relative to the body for movement of the movable wall section to and between its retracted and extended positions, said at least one linkage assembly comprising: (i) an inner link comprising opposite inner and outer ends; and (ii) an outer link comprising opposite inner and outer ends, wherein:
    said inner end of said inner link is pivotally connected to said body;
    said outer end of said outer link is pivotally connected to said movable wall section;
    said outer end of said inner link is pivotally connected to said inner end of said outer link;
    wherein:
        said inner end of said inner link pivots relative to said body about a first pivot axis, said outer end of said outer link pivots relative to said movable wall section about a second pivot axis, and said outer end of said inner link pivots relative to said inner end of said outer link about a third pivot axis;
        said first pivot axis, said second pivot axis, and said third pivot axis are all parallel with respect to each other and are located in a first common reference plane when said movable wall section is located in said retracted position and are located in a second common reference plane that is transversely oriented relative to said first common reference plane when said movable wall section is located in said extended position;
        said first reference plane lies parallel to an outer wall of the movable wall section, and wherein said inner link and said outer link lie adjacent said outer wall of the movable wall section when said movable wall section is located in said retracted position.

2. The expandable wall shelter as set forth in claim 1, wherein said first pivot axis, said second pivot axis, and third pivot axis of said at least one linkage assembly are all arranged parallel to each other when said movable wall section is located in said retracted position, said extended position, and all positions between said retracted position and said extended position.

3. The expandable wall shelter as set forth in claim 1, wherein said at least one linkage assembly comprises first and second linkage assemblies respectively located adjacent opposite first and second lateral sides of said movable wall section when said movable wall section is in said extended position.

4. The expandable wall shelter as set forth in claim 3, wherein:
    said first axis, said second axis, and said third axis of said first linkage assembly are vertically oriented; and,
    said first axis, said second axis, and said third axis of said second linkage assembly are vertically oriented.

5. The expandable wall shelter as set forth in claim 4, wherein said at least one linkage assembly further comprises a third linkage assembly located under a bottom wall of said movable wall section when said movable wall section is in said extended position, wherein said first axis, said second axis, and said third axis of said third linkage assembly are horizontally oriented.

6. The expandable wall shelter as set forth in claim 5, wherein said first axis, said second axis, and said third axis of each of said first, second, and third link assemblies are all located in the first common reference plane when said movable wall section is located in said retracted position.

7. The expandable wall shelter as set forth in claim 6, wherein the inner and outer links of all of said first, second, and third linkage assemblies lie adjacent said outer wall when said movable wall section is located in said retracted position.

8. The expandable wall shelter as set forth in claim 1, further comprising at least one roller connected to the movable wall section and rotatably engaged with a floor of the body for movably supporting said movable wall section for linear movement relative to the body as said movable wall section moves between its retracted and extended positions.

9. The expandable wall shelter as set forth in claim 1, mounted on a wheeled vehicle.

10. The expandable wall shelter as set forth in claim 1, wherein said movable wall section is at least partially covered by one or more a movable exterior wall panels of said body when said movable wall section is located in said retracted position.

11. An expandable wall shelter comprising:
    a body;
    a movable wall section connected to the body and movable between a retracted position and an extended position;
    at least one linkage assembly operably connected between the body and the movable wall section for operably and movably supporting the movable wall section relative to the body for movement of the movable wall section to and between its retracted and extended positions, said at least one linkage assembly comprising: (i) an inner link comprising opposite inner and outer ends; and (ii) an outer link comprising opposite inner and outer ends, wherein:
    said inner end of said inner link is pivotally connected to said body;
    said outer end of said outer link is pivotally connected to said movable wall section;
    said outer end of said inner link is pivotally connected to said inner end of said outer link;

wherein said inner end of said inner link pivots relative to said body about a first pivot axis, said outer end of said outer link pivots relative to said movable wall section about a second pivot axis, and said outer end of said inner link pivots relative to said inner end of said outer link about a third pivot axis;

wherein said first pivot axis, said second pivot axis, and said third pivot axis of said at least one linkage assembly are located in a first common reference plane when said movable wall section is located in said retracted position and are located in a second common reference plane that is transversely oriented relative to said first common reference plane when said movable wall section is located in said extended position;

and wherein an angle (A) having a vertex coincident with the third pivot axis is defined between said inner link and said outer link, and wherein: (i) A=0° when said movable wall section is located in said retracted position; (ii) A≥180° when said movable wall section is located in said extended position; and (iii) 0°<A<180° when said movable wall section is located in a partially extended position between the retracted position and the extended position.

12. The expandable wall shelter as set forth in claim 11, wherein said movable wall section moves on a linear path between said retracted position and said extended position.

13. The expandable wall shelter as set forth in claim 11, wherein said first reference plane lies parallel to an outer wall of the movable wall section, and wherein said inner link and said outer link lie adjacent said outer wall of the movable wall section when said movable wall section is located in said retracted position.

14. The expandable wall shelter as set forth in claim 13, wherein said inner link and said outer link are abutted with said outer wall when said movable wall section is in said retracted position.

15. A linkage assembly for supporting an associated movable wall section for movement along a linear path between a retracted position and an extended position, said linkage assembly comprising:

an inner link comprising opposite inner and outer ends;
an outer link comprising opposite inner and outer ends;
said inner end of said inner link adapted to be pivotally connected to an associated body for pivoting movement about a first pivot axis;
said outer end of said outer link adapted to be pivotally connected the associated movable wall section for pivoting movement about a second pivot axis;
said outer end of said inner link pivotally connected to said inner end of said outer link for pivoting movement about a third pivot axis;
wherein:
(i) said first pivot axis, said second pivot axis, and said third pivot axis are all arranged parallel to each other for all positions of the linkage assembly;
(ii) said first pivot axis, said second pivot axis, and said third pivot axis are all located in a first common reference plane when said linkage assembly is located in a retracted position corresponding to the retracted position of the associated movable wall section;
(iii) said first pivot axis, said second pivot axis, and said third pivot axis are all located in a second common reference plane that is transversely oriented relative to the first common reference plane when said linkage assembly is located in an extended position corresponding to the extended position of the associated movable wall section;

(iv) said inner link and said outer link define an angle (A) therebetween having a vertex coincident with the third pivot axis, wherein: (i) A=0 degrees when said linkage assembly is arranged in its retracted position; (ii) A≥180 degrees when said linkage assembly is arranged in its extended position; and (iii) A is greater than 0 degrees and less than 180 degrees (0<A<180) when the linkage assembly is arranged in a partially extended position between said retracted position of said link assembly and said extended position of said link assembly.

16. A linkage assembly for supporting an associated movable wall section for movement along a linear path between a retracted position and an extended position, said linkage assembly comprising:

an inner link comprising opposite inner and outer ends;
an outer link comprising opposite inner and outer ends;
said inner end of said inner link adapted to be pivotally connected to an associated body for pivoting movement about a first pivot axis;
said outer end of said outer link adapted to be pivotally connected the associated movable wall section for pivoting movement about a second pivot axis;
said outer end of said inner link pivotally connected to said inner end of said outer link for pivoting movement about a third pivot axis;
wherein:
(i) said first pivot axis, said second pivot axis, and said third pivot axis are all arranged parallel to each other for all positions of the linkage assembly;
(ii) said first pivot axis, said second pivot axis, and said third pivot axis are all located in a first common reference plane when said linkage assembly is located in a retracted position corresponding to the retracted position of the associated movable wall section;
(iii) said first pivot axis, said second pivot axis, and said third pivot axis are all located in a second common reference plane that is transversely oriented relative to the first common reference plane when said linkage assembly is located in an extended position corresponding to the extended position of the associated movable wall section.

17. An expandable wall shelter comprising:
a body;
a movable wall section connected to the body and movable between a retracted position and an extended position;
at least one linkage assembly operably connected between the body and the movable wall section for operably and movably supporting the movable wall section relative to the body for movement of the movable wall section to and between its retracted and extended positions, said at least one linkage assembly comprising: (i) an inner link comprising opposite inner and outer ends; and (ii) an outer link comprising opposite inner and outer ends, wherein:
said inner end of said inner link is pivotally connected at a first axis to said body;
said outer end of said outer link is pivotally connected at a second axis to said movable wall section;
said outer end of said inner link is pivotally connected at a third axis to said inner end of said outer link;
wherein said at least one linkage assembly comprises first and second linkage assemblies respectively located adjacent opposite first and second lateral sides of said movable wall section when said movable wall section is in said extended position;

and wherein: (i) said first axis, said second axis, and said third axis of said first linkage assembly are vertically oriented; and (ii) said first axis, said second axis, and said third axis of said second linkage assembly are vertically oriented.

\* \* \* \* \*